(12) United States Patent
Kim et al.

(10) Patent No.: US 11,625,118 B2
(45) Date of Patent: Apr. 11, 2023

(54) ELECTRONIC DEVICE HAVING INPUT SENSOR

(71) Applicant: Samsung Display Co., Ltd., Yongin-si (KR)

(72) Inventors: Junghak Kim, Hwaseong-si (KR); Youngsik Kim, Yongin-si (KR); Kyowon Ku, Seoul (KR); Jeongheon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/444,906

(22) Filed: Aug. 11, 2021

(65) Prior Publication Data

US 2022/0147212 A1 May 12, 2022

(30) Foreign Application Priority Data

Nov. 6, 2020 (KR) ........................ 10-2020-0147840

(51) Int. Cl.
*G06F 3/041* (2006.01)
*G06F 3/044* (2006.01)
*G06F 3/0354* (2013.01)

(52) U.S. Cl.
CPC ...... *G06F 3/04162* (2019.05); *G06F 3/03545* (2013.01); *G06F 3/0441* (2019.05); *G06F 3/0443* (2019.05); *G06F 3/0446* (2019.05); *G06F 2203/04104* (2013.01); *G06F 2203/04111* (2013.01)

(58) Field of Classification Search
CPC .. G06F 3/04162; G06F 3/0441; G06F 3/0446; G06F 3/0443; G06F 3/03545; G06F 2203/04104; G06F 2203/04111
See application file for complete search history.

(56) References Cited

U.S. PATENT DOCUMENTS

| | | | |
|---|---|---|---|
| 10,152,145 B2 | 12/2018 | Fleck et al. | |
| 10,795,483 B2 | 10/2020 | Hwang et al. | |
| 2015/0160754 A1* | 6/2015 | Wenzel | G06F 3/041662 345/174 |
| 2018/0232070 A1 | 8/2018 | Katsurahira | |
| 2019/0235678 A1* | 8/2019 | Kim | G06F 3/0418 |
| 2020/0110484 A1 | 4/2020 | Kim et al. | |

FOREIGN PATENT DOCUMENTS

| | | |
|---|---|---|
| KR | 10-2017-0139112 A | 12/2017 |
| KR | 10-2020-0009800 A | 1/2020 |
| KR | 10-2020-0039889 A | 4/2020 |

\* cited by examiner

*Primary Examiner* — Lisa S Landis
(74) *Attorney, Agent, or Firm* — Lewis Roca Rothgerber Christie LLP

(57) ABSTRACT

An electronic device, includes: a display panel; and an input sensor on the display panel, wherein the input sensor includes a plurality of sensing electrodes, each having a first region and a second region that surrounds the first region, each of the plurality of sensing electrodes including a pen electrode configured to detect an input tool and a touch electrode configured to detect a touch input, wherein the pen electrode is at the first region, and wherein the touch electrode is at the second region.

19 Claims, 11 Drawing Sheets

ELECTRONIC DEVICE HAVING INPUT SENSOR

CROSS-REFERENCE TO RELATED APPLICATION

The present application claims priority to and the benefit of Korean Patent Application No. 10-2020-0147840 filed on Nov. 6, 2020 in the Korean Intellectual Property Office, the entire disclosure of which is hereby incorporated by reference.

BACKGROUND

Aspects of some embodiments of the present invention relate to an electronic device.

A display device for displaying images may be included in various multimedia electronic devices, such as televisions, mobile phones, tablet computers, navigations, and gate consoles. An electronic device may include an input sensor that provides touch-based input methods other than typical input methods via button, keyboard, or mouse, in which touch-based input method a user intuitively and conveniently inputs information or command.

The input sensor may detect touch or pressure from user's body. There is an increasing demand for an electronic pen to provide a detailed touch input for a user who is familiar with using a writing instrument to input information or for a specific application program (e.g., an application program for sketch or drawing). Accordingly, an input sensor employed in the electronic device is required to detect various inputs such as an electronic-pen input as well as a user's touch or pressure input.

The above information disclosed in this Background section is only for enhancement of understanding of the background and therefore the information discussed in this Background section does not necessarily constitute prior art.

SUMMARY

Aspects of some embodiments of the present invention relate to an electronic device, and for example, to an electronic device with increased input detection capability.

Aspects of some embodiments of the present invention include an electronic device capable of preventing a reduction in input detection capability at high speed operation.

According to some embodiments of the present invention, an electronic device includes: a display panel; and an input sensor on the display panel. The input sensor may include a plurality of sensing electrodes in each of which are defined a first region and a second region that surrounds the first region. Each of the plurality of sensing electrodes may include a pen electrode to detect an input tool and a touch electrode to detect a user's touch. The pen electrode may be at the first region. The touch electrode may be at the second region.

According to some embodiments, each of the plurality of sensing electrodes may further include a ground electrode at a third region defined between the first region and the second region.

According to some embodiments, the pen electrode and the touch electrode may be separated from each other across the ground electrode. The pen electrode, the touch electrode, and the ground electrode may be electrically insulated from each other.

According to some embodiments, the electronic device may further comprise a sensor controller connected to the input sensor. During a first frame, the sensor controller may provide the pen electrode and the touch electrode with an uplink signal transmitted to the input sensor. During a second frame, the sensor controller may receive a downlink signal through the pen electrode from the input tool and receive a touch signal through the touch electrode from the user's touch.

According to some embodiments, the uplink signal may include a first signal applied to the pen electrode and a second signal applied to the touch electrode. The first signal and the second signal may have phases opposite to each other.

According to some embodiments, the sensor controller may include an input-tool controller and a touch controller. The input-tool controller may apply the first signal to the pen electrode during the first frame and receive the downlink signal from the input tool during the second frame. The touch controller may apply the second signal to the touch electrode during the first frame and receive the touch signal from the user' touch during the second frame.

According to some embodiments, the plurality of sensing electrodes may include: a plurality of first sensing electrodes arranged in a first direction; and a plurality of second sensing electrodes arranged in a second direction that intersects the first direction. The first sensing electrodes and the second sensing electrodes may be electrically insulated from each other.

According to some embodiments, the pen electrode may include a first pen electrode and a second pen electrode. Each of the first sensing electrodes may include the first pen electrode. Each of the second sensing electrodes may include the second pen electrode.

According to some embodiments, the touch electrode may include a first touch electrode and a second touch electrode. Each of the first sensing electrodes may include the first touch electrode. Each of the second sensing electrodes may include the second touch electrode.

According to some embodiments, the downlink signal may include: a first downlink signal received from the first pen electrode; and a second downlink signal received from the second pen electrode. Based on the first and second downlink signals, the sensor controller may determine a coordinate of the input tool.

According to some embodiments, the input sensor may further include: a pen bridge electrode that connects the plurality of pen electrodes that are adjacent to each other; a touch bridge electrode that connects the plurality of touch electrodes that are adjacent to each other; and a ground bridge electrode that connects the plurality of ground electrodes that are adjacent to each other.

According to some embodiments, the input sensor may further include: a first signal line connected to the pen electrode; a second signal line connected to the touch electrode; and a third signal line connected to the ground electrode. Each of the first and second signal lines may be connected to the sensor controller that drives the input sensor. The third signal line may be grounded.

According to some embodiments, the first region surrounded by the second region may be provided in plural. The pen electrode may be at each of the plurality of first regions.

According to some embodiments, each of the plurality of sensing electrodes may further include a ground electrode that is electrically grounded. The ground electrode may be located at each of a plurality of third regions that are defined between the second region and the plurality of first regions. The plurality of third regions may correspondingly surround the plurality of first regions.

According to some embodiments of the present invention, an electronic device includes: a display panel; an input sensor on the display panel; and a sensor controller connected to the input sensor, the sensor controller driving the input sensor. The input sensor may include a plurality of sensing electrodes in each of which are defined a first region and a second region that surrounds the first region. Each of the plurality of sensing electrodes may include a pen electrode at the first region and a touch electrode at the second region. The sensor controller may detect an input tool through the pen electrode and detect a user's touch through the touch electrode.

According to some embodiments, the sensor controller may independently drive the pen electrode and the touch electrode at different frequency bands from each other.

According to some embodiments, during a first frame, the sensor controller may provide the input tool with an uplink signal through the pen electrode and the touch electrode. During a second frame, the sensor controller may receive a downlink signal through the pen electrode from the input tool and receive a touch signal through the touch electrode from the user's touch.

According to some embodiments, the uplink signal may include a first signal applied to the pen electrode and a second signal applied to the touch electrode. The first signal and the second signal may have phases opposite to each other.

According to some embodiments, each of the plurality of sensing electrodes may further include a ground electrode that is electrically grounded. The ground electrode may be at a third region defined between the first region and the second region.

According to some embodiments of the present invention, an electronic device may comprise: a display panel; an input sensor on the display panel; and a sensor controller connected to the input sensor. The input sensor may include a plurality of sensing electrodes in each of which are defined a first region and a second region that surrounds the first region. Each of the plurality of sensing electrodes may include a first electrode at the first region and a second electrode at the second region. The sensor controller may provide the second electrode with a detection signal to detect an input from one or both of an input tool and a user's touch and provide the first electrode with a compensation signal to compensate the detection signal.

According to some embodiments, the detection signal and the compensation signal may have phases opposite to each other.

According to some embodiments, each of the plurality of sensing electrodes may further include a third electrode that is electrically grounded. The third electrode may be at a third region defined between the first region and the second region.

DETAILED DESCRIPTION

Figure 1A:
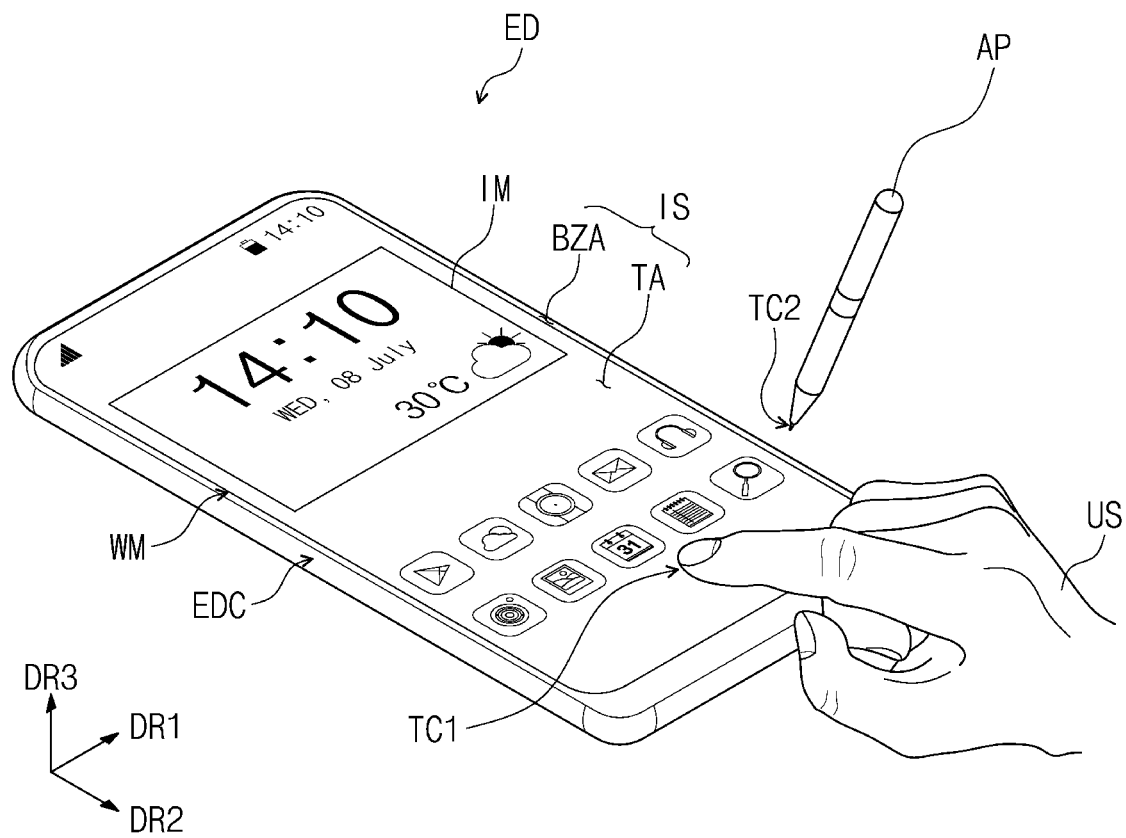
FIG. 1A illustrates a perspective view showing an electronic device according to some embodiments of the present invention.

In this description, when a certain component (or region, layer, portion, etc.) is referred to as being "on", "connected to", or "coupled to" other component(s), the certain component may be directly located on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

Figure 1B:
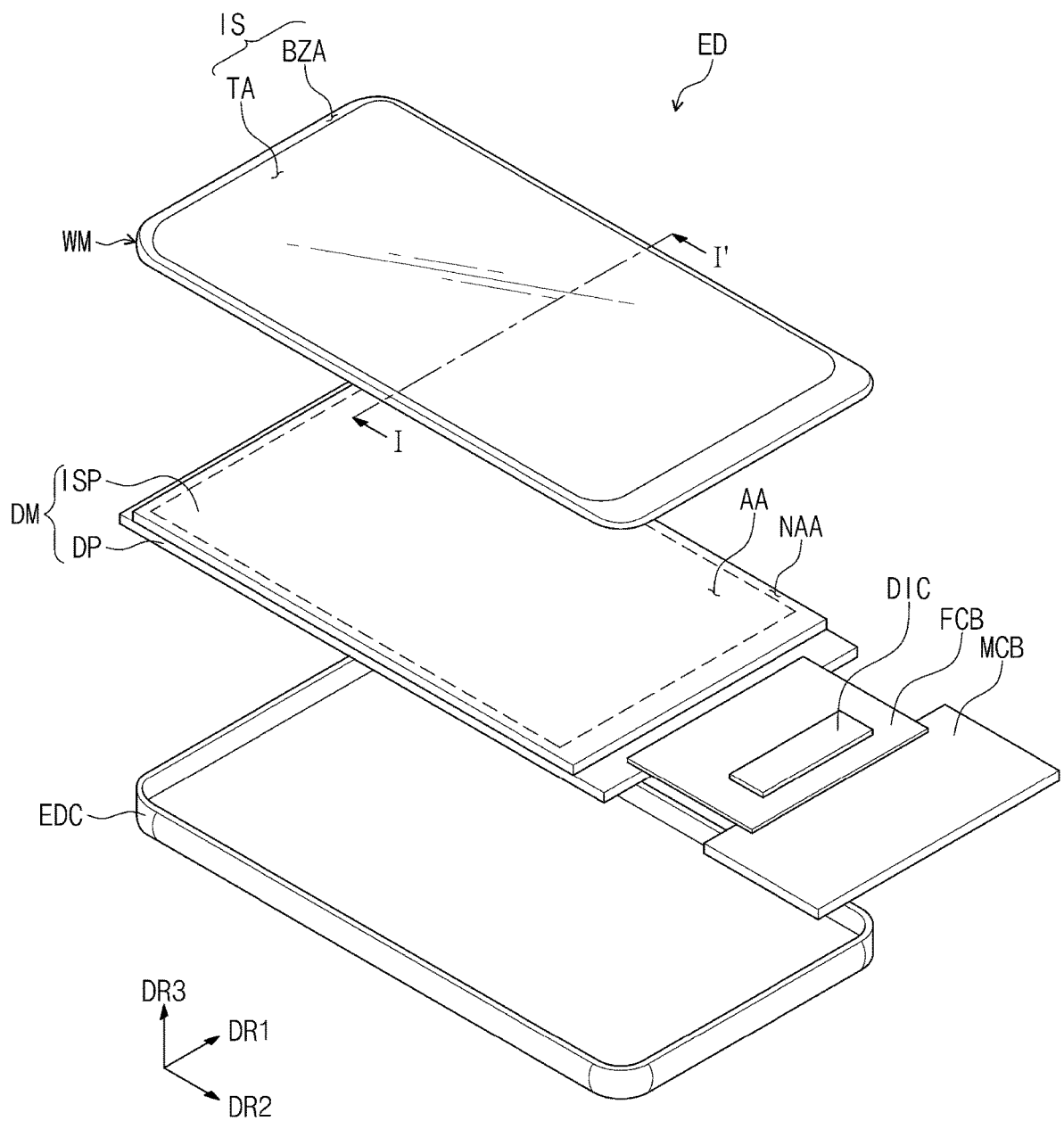
FIG. 1B illustrates an exploded perspective view showing an electronic device according to some embodiments of the present invention.
Figure 2:
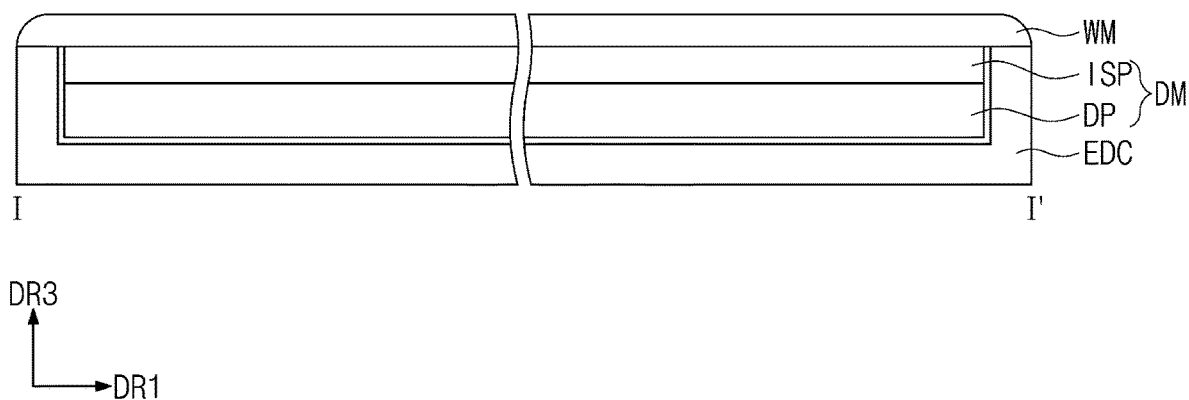
FIG. 2 illustrates a cross-sectional view showing an electronic device according to some embodiments of the present invention.

FIG. 1A illustrates a perspective view showing an electronic device according to some embodiments of the present invention. FIG. 1B illustrates an exploded perspective view showing an electronic device according to some embodiments of the present invention. FIG. 2 illustrates a cross-sectional view showing an electronic device according to some embodiments of the present invention.

Referring to FIGS. 1A and 1B, an electronic device ED may be an apparatus that is activated in response to electrical signals. The electronic device ED may include various embodiments. For example, the electronic device ED may be applicable to an electronic apparatus, such as smart watch, tablet computer, laptop computer, desktop computer, smart television, or any other suitable electronic device.

The electronic device ED may display an image IM in a third direction DR3 on a display surface IS parallel to each of first and second directions DR1 and DR2. The display surface IS that displays the image IM may correspond to a front surface of the electronic device ED. The image IM may include dynamic images or static images.

According to some embodiments, front and rear surfaces (or top and bottom surfaces) of each component are defined based on a direction along which the image IM is displayed. The front and rear surfaces may be opposite to each other in the third direction DR3, and a normal direction to each of the front and rear surfaces may be parallel to the third direction DR3.

A spacing distance in the third direction DR3 between the front and rear surfaces may correspond to a thickness in the third direction DR3 of the electronic device ED. The first, second, and third directions DR1, DR2, and DR3 are relative concepts, and may be changed into other directions.

The electronic device ED may detect an externally applied input. The external input may include various inputs provided from outside the electronic device ED. The electronic device ED according to some embodiments of the present invention may detect a first input TC1 from a user's touch US that is externally applied. The first input TC1 of the user's touch US may be user's body part, light, heat, pressure, any other external input, or any combination thereof. According to some embodiments, an example is discussed in which the first input TC1 of the user's touch US is a touch input from a user's hand applied to the front surface of the electronic device ED, but this is merely an example, and the first input TC1 of the user's touch US may be provided in the form of various types as discussed above. In addition, based on its structure, the electronic device ED may detect the first input TC1 of the user's touch US applied to a lateral or rear surface of the electronic device ED, but embodiments according to the present invention are not limited to a certain embodiment.

Moreover, the electronic device ED according to some embodiments of the present invention may detect a second input TC2 externally applied. The second input TC2 may include inputs from an input tool AP other than hands, for example from a stylus pen, an active pen, a touch pen, an electronic pen, or an e-pen. In this description, an example will be discussed in which the second input TC2 is an input from an active pen.

The front surface of the electronic device ED may be divided into a transmission region TA and a bezel region BZA. The transmission region TA may be a section where an image IM is displayed. A user may view the image IM at the transmission region TA. According to some embodiments, the transmission region TA is shown to have rounded rectangular shapes at vertices thereof. This, however, is merely an example, and the transmission region TA may have various shapes without being limited to a particular embodiment.

The bezel region BZA is adjacent to the transmission region TA. The bezel region BZA may have a certain color. The bezel region BZA may surround the transmission region TA. Therefore, the transmission region TA may have a shape that is substantially defined by the bezel region BZA. This, however, is illustrated as an example shape, and the bezel region BZA may be formed to adjoin only one side of the transmission region TA or may be omitted. The electronic device ED is not limited to a particular embodiment, but may include various shapes or forms.

As shown in FIG. 1B, the electronic device ED may include a display module DM and a window WM located on the display module DM. The display module DM may include a display panel DP and an input sensor ISP.

The display panel DP according to some embodiments of the present invention may be an emissive display panel, but embodiments according to the present invention are not limited thereto. For example, the display panel DP may be an organic light emitting display panel or a quantum-dot light emitting display panel. An emission layer of the organic light emitting display panel may include an organic light emitting material. An emission layer of the quantum-dot light emitting display panel may include a quantum-dot or a quantum-rod. The following will describe an example in which the display panel DP is an organic light emitting display panel.

FIGS. 1A and 1B depicts that the electronic device ED has a flat structure, but embodiments according to the present invention are not limited thereto. The electronic device ED may be bendable or foldable about a folding axis or may have a slidable structure.

Referring to FIG. 2, the input sensor ISP may be directly located on the display panel DP. According to some embodiments of the present invention, a successive process may form the input sensor ISP on the display panel DP. For example, when the input sensor ISP is directly located on the display panel DP, no adhesive film may be placed between the input sensor ISP and the display panel DP. For another example, an inner adhesive film may be located between the input sensor ISP and the display panel DP. In this case, the input sensor ISP and the display panel DP may not be fabricated in a successive process, but after the input sensor ISP is fabricated in a separate process from that of the display panel DP, the input sensor ISP may be fixed through the inner adhesive film to a top surface of the display panel DP.

The display panel DP outputs the image IM, and the input sensor ISP obtains coordinate information of an external input (e.g., the first and second inputs TC1 and TC2).

The window WM may be formed of a transparent material capable of displaying the image IM. For example, the window WM may consist of glass, sapphire, plastic, or the like. The window WM is illustrated as a single layer, but embodiments according to the present invention are not limited thereto, and the window WM may include a plurality of layers.

An antireflective layer may further be located between the window WM and the display module DM. The antireflective layer reduces a reflectance of external light that is incident from above the window WM. The antireflective layer according to some embodiments of the present invention may include a retarder and a polarizer. The retarder may be of a film type or a liquid crystal coating type, and may include a λ/2 retarder and/or a λ/4 retarder. The polarizer may also be of a film type or a liquid crystal coating type. The film type may include a stretchable synthetic resin film, and the liquid crystal coating type may include arrayed liquid crystals. The retarder and the polarizer may collectively achieve a single polarizing film.

In response to an electrical signal, the display module DM may display an image, and may receive and/or transfer information about an external input. The display module DM may include an active region AA and a peripheral region NAA. The active region AA may be defined as a section that displays an image provided from the display module DM.

The peripheral region NAA is adjacent to the active region AA. For example, the peripheral region NAA may surround the active region AA. This, however, is merely and example, and the peripheral region NAA is not limited to a particular embodiment, and may be defined to have various shapes. According to some embodiments, the active region AA of the display module DM may correspond to at least a portion of the transmission region TA.

The electronic device ED may further include a main circuit board MCB, a flexible circuit film FCB, and a driver chip DIC. The main circuit board MCB may be coupled to the flexible circuit film FCB and electrically connected to the display panel DP. The main circuit board MCB may include a plurality of driving elements. The plurality of driving elements may include a circuit part to drive the display panel DP. The flexible circuit film FCB may be coupled to the display panel DP to electrically connect the display panel DP to the main circuit board MCB. The driver chip DIC may be mounted on the flexible circuit film FCB.

The driver chip DIC may include driving elements, such as data driving circuit, for driving pixels of the display panel DP. The flexible circuit film FCB according to some embodiments of the present invention is illustrated as a single film, but embodiments according to the present invention are not limited thereto, and the flexible circuit film FCB may be provided in plural coupled to the display panel DP. FIG. 1B depicts a structure in which the driver chip DIC is mounted on the flexible circuit film FCB, but embodiments according to the present invention are not limited thereto. For example, the driver chip DIC may be directly mounted on the display panel DP. In this case, a section where the driver chip DIC of the display panel DP is mounted may bend to rest on a rear surface of the display module DM.

The input sensor ISP may be electrically connected through the flexible circuit film FCB to the main circuit board MCB. Embodiments according to the present invention, however, are not limited thereto. For example, the display module DM may further include another flexible circuit film to electrically connect the input sensor ISP to the main circuit board MCB.

Referring back to FIG. 1B, the electronic device ED further includes an outer casing EDC that accommodates the display module DM. The outer casing EDC and the window WM may be connected to each other to define an appearance of the electronic device ED. The outer casing EDC may absorb externally applied impact and prevent the display module DM from foreign substances and moisture, thereby protecting components accommodated in the outer casing EDC. As an example of the present invention, the outer casing EDC may be provided as a structure in which a plurality of receiving members are connected to each other.

The electronic device ED according to some embodiments may further include an electronic module that includes various functional modules for driving the display module DM, a power supply module that supplies a power required for driving an overall operation of the electronic device ED, and a bracket that is coupled to the display module DM and/or the outer casing EDC to thereby divide an inner space of the electronic device ED.

Figure 3:
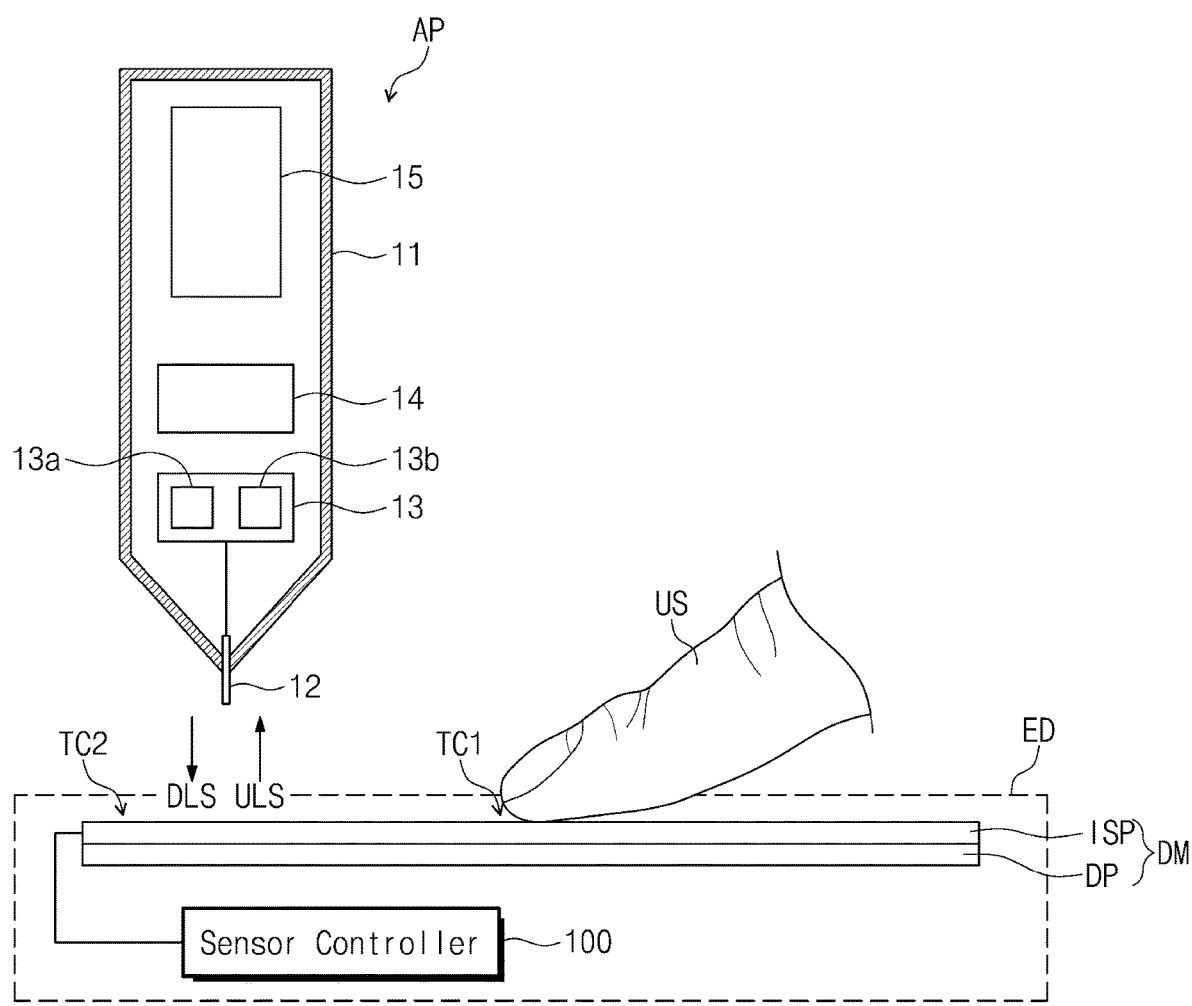
FIG. 3 illustrates a block diagram showing an operation of an electronic device according to some embodiments of the present invention.

FIG. 3 illustrates a block diagram showing an operation of an electronic device according to some embodiments of the present invention.

Referring to FIG. 3, the electronic device ED according to some embodiments of the present invention further includes a sensor controller 100 connected to the input sensor ISP. The sensor controller 100 may control a driving of the input sensor ISP. As an example of the present invention, the sensor controller 100 may be mounted on the main circuit board (see MCB of FIG. 1B). Embodiments according to the present invention, however, are not limited thereto. For example, the sensor controller 100 may be embedded in the driver chip (see DIC of FIG. 1B).

The input sensor ISP may include a plurality of sensing electrodes. A structure and operation of the input sensor ISP will be further discussed in detail below with reference to FIGS. 4 to 7.

The sensor controller 100 may be connected to the sensing electrodes of the input sensor ISP. The sensor controller 100 may drive the input sensor ISP to simultaneously detect the first input TC1 and the second input TC2 in the same frame.

As shown in FIG. 3, the input tool AP may include a housing 11, a conductive tip 12, and a communication module 13. The housing 11 may have a pen shape, and may an accommodation space may be formed in the housing 11. The conductive tip 12 may outwardly protrude from an open side of the housing 11. The conductive tip 12 of the input tool AP may be a part in direct contact with the input sensor ISP.

The communication module 13 may include a transmitting circuit 13*a* and a receiving circuit 13*b*. The transmitting circuit 13*a* may transmit a downlink signal DLS to the sensor controller 100. The downlink signal DLS may include pen data, position information of the input tool AP, tilts of the input tool AP, and state information. When the input tool AP contacts the input sensor ISP, the sensor controller 100 may receive the downlink signal DLS through the input sensor ISP.

The receiving circuit 13*b* may receive an uplink signal ULS from the sensor controller 100. The uplink signal ULS may include beacon signals, panel information, protocol versions, and the like. The sensor controller 100 may supply a plurality of electrodes with the uplink signal ULS to detect an approach of the input tool AP. When the input tool AP approaches the electronic device ED, the input tool AP may receive the uplink signal ULS through a plurality of electrodes. For example, the input tool AP may receive the uplink signal ULS through a pen electrode. This will be further discussed in detail below.

The input tool AP further includes an input controller 14 to control an operation of the input tool AP. The input controller 14 may be configured to operate in accordance with a preset program. The transmitting circuit 13*a* may receive signals supplied from the input controller 14 to modulate the received signals into signals that can be sensed by the input sensor ISP, and the receiving circuit 13*b* may receive signals through sensing electrodes of the input sensor ISP to modulate the received signals into signals that can be processed by the input controller 14.

The input tool AP may further include a power module 15 to supply the input tool AP with power.

Figure 4:
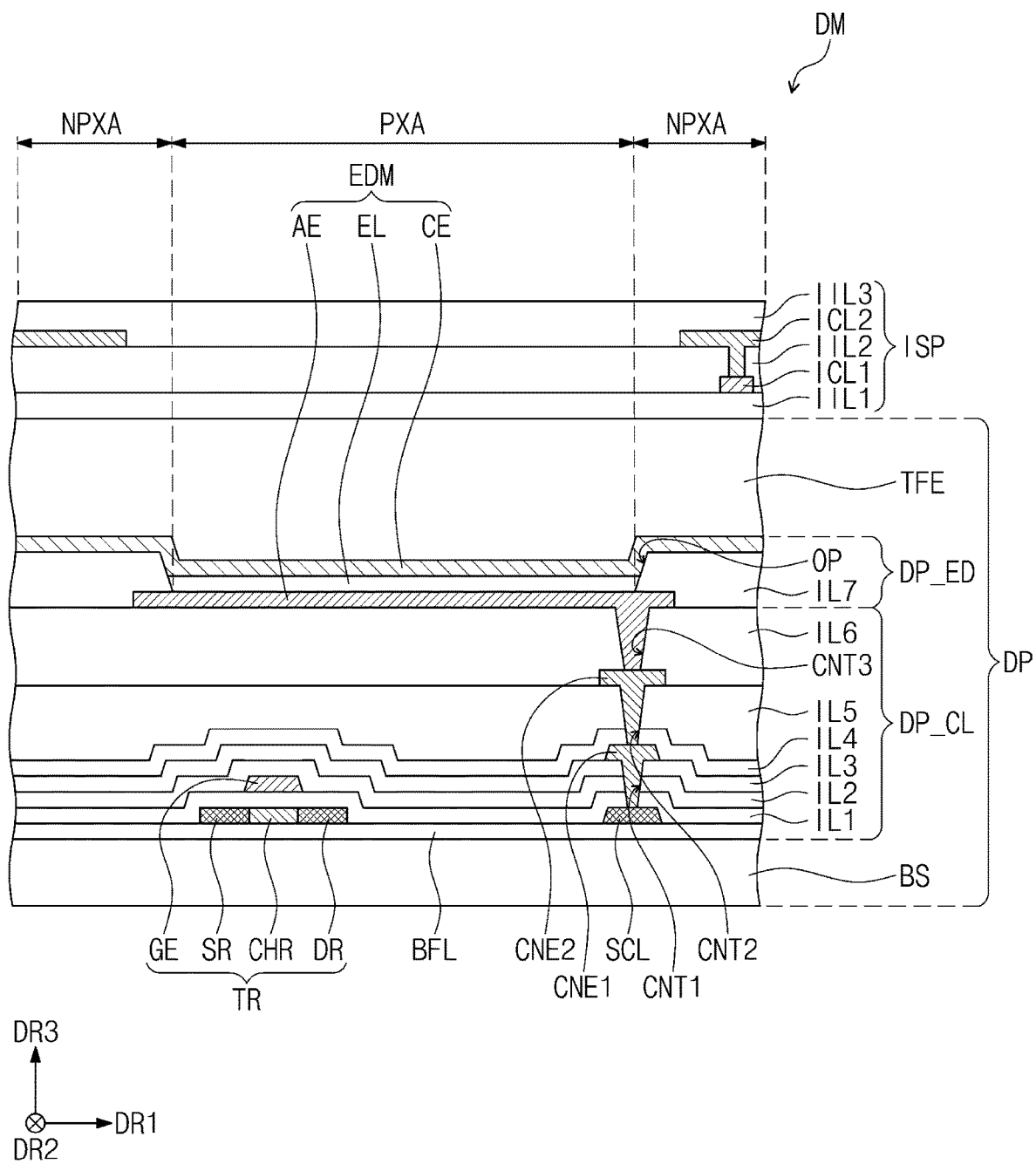
FIG. 4 illustrates a cross-sectional view showing a display module according to some embodiments of the present invention.

FIG. 4 illustrates a cross-sectional view showing the display module DM according to some embodiments of the present invention.

Referring to FIG. 4, the display module DM may include the display panel DP and the input sensor ISP directly arranged on the display panel DP. The display panel DP may include a base layer BS, a circuit layer DP_CL, a light emitting element layer DP_ED, and an encapsulation layer TFE.

The base layer BS may provide a base surface on which the circuit layer DP_CL is located. The base layer BS may be a glass substrate, a metal substrate, or a polymer substrate. Embodiments according to the present invention, however, are not limited thereto, and the base layer BS may be an inorganic layer, an organic layer, or a composite material layer.

The base layer BS may have a multi-layered structure. For example, the base layer BS may have a tri-layered structure of a synthetic resin layer, an adhesive layer, and a synthetic resin layer. For example, the synthetic resin layer may include a polyimide-based resin. Additionally or alternatively, the synthetic resin layer may include one or more of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin.

The circuit layer DP_CL may be located on the base layer BS. The circuit layer DP_CL may include a dielectric layer, a semiconductor pattern, a conductive pattern, and a signal line. Coating and deposition processes may be employed such that a dielectric layer, a semiconductor layer, and a conductive layer are formed on the base layer BS, and then a photolithography process may be performed several times to selectively pattern the dielectric layer, the semiconductor layer, and the conductive layer. Afterwards, a semiconductor pattern, a conductive pattern, and a signal line may be formed all of which are included in the circuit layer DP_CL.

At least one inorganic layer may be formed on a top surface of the base layer BS. The inorganic layer may include one or more of aluminum oxide, titanium oxide, silicon oxide, silicon oxynitride, zirconium oxide, and hafnium oxide. The inorganic layer may be formed as multi-layer. The multi-layered inorganic layers may constitute a barrier layer and/or a buffer layer. According to some embodiments, the display panel DP is illustrated to include a buffer layer BFL.

The buffer layer BFL may increase a bonding force between the base layer BS and the semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. The present invention, however, is not limited thereto, and the semiconductor pattern may include amorphous silicon or metal oxide.

FIG. 4 merely depicts a portion of the semiconductor pattern, and the semiconductor pattern may further be located at other regions. The semiconductor pattern may be specifically arranged over pixels. The semiconductor pattern may have different electrical characteristics based on whether being doped or not. The semiconductor pattern may include a doped region and an undoped region. The doped region may be implanted with n-type or p-type dopants. A PMOS transistor may include a doped region implanted with p-type dopants, and an NMOS transistor may include a doped region implanted with n-type dopants.

The doped region may have conductivity greater than that of the undoped region, and may substantially serve as an electrode or a signal line. The undoped region may substantially correspond to an active region (or channel region) of a transistor. For example, a portion of the semiconductor pattern may be an active region of a transistor, and other portion of the semiconductor pattern may be a source or drain region of the transistor.

Each of the pixels may have an equivalent circuit that includes seven transistors, one capacitor, and a light emitting element, and the equivalent circuit of the pixel may be variously changed. FIG. 4 depicts by way of example one transistor TR and a light emitting element EDM that are included in the pixel.

The transistor TR may include a source region SR, an active region CHR, and a drain region DR that are formed from the semiconductor pattern. When viewed in cross-section, the source region SR and the drain region DR may be provided in opposite directions from the active region CHR. FIG. 4 shows a portion of a signal line SCL located on the same layer on which the semiconductor pattern is located. According to some embodiments, when viewed in a plan view (e.g., when viewed in a direction perpendicular or normal with respect to a display surface), the signal line SCL may be electrically connected to the transistor TR.

A first dielectric layer IL1 may be located on the buffer layer BFL. The first dielectric layer IL1 may commonly overlap a plurality of pixels and may cover the semiconductor pattern. The first dielectric layer IL1 may be an inorganic layer and/or an organic layer, and may have a single-layered or multi-layered structure. The first dielectric layer IL1 may include one or more of aluminum oxide, titanium oxide, silicon oxide, silicon oxynitride, zirconium oxide, and hafnium oxide. According to some embodiments, the first dielectric layer IL1 may be a single-layered silicon oxide layer. Likewise the first dielectric layer IL1, the following dielectric layers of the circuit layer DP_CL may be an inorganic layer and/or an organic layer, and may have a single-layered or multi-layered structure. The inorganic layer may include at least one of the materials mentioned above, but embodiments according to the present invention are not limited thereto.

A gate GE of the transistor TR is located on the first dielectric layer IL1. The gate GE may be a portion of the semiconductor pattern. The gate GE overlaps the active region CHR. The gate GE may serve as a mask in a process in which the semiconductor pattern is doped.

A second dielectric layer IL2 may be located on the first dielectric layer IL1, covering the gate GE. The second dielectric layer IL2 may commonly overlap the pixels. The second dielectric layers IL2 may be an inorganic layer and/or an organic layer, and may have a single-layered or multi-layered structure. According to some embodiments, the second dielectric layer IL2 may be a single-layered silicon oxide layer.

A third dielectric layer IL3 may be located on the second dielectric layer IL2, and in the present invention, the third dielectric layer IL3 may be a single-layered silicon oxide layer.

A first connection electrode CNE1 may be located on the third dielectric layer IL3. The first connection electrode CNE1 may be coupled to the signal line SCL through a contact hole CNT1 that penetrates the first, second, and third dielectric layers IL1, IL2, and IL3.

A fourth dielectric layer IL4 may be located on the third dielectric layer IL3. The fourth dielectric layer IL4 may be a single-layered silicon oxide layer. A fifth dielectric layer IL5 may be located on the fourth dielectric layer IL4. The fifth dielectric layer IL5 may be an organic layer.

A second connection electrode CNE2 may be located on the fifth dielectric layer IL5. The second connection electrode CNE2 may be coupled to the first connection electrode CNE1 through a contact hole CNT2 that penetrates the fourth and fifth dielectric layers IL4 and IL5.

A sixth dielectric layer IL6 may be located on the fifth dielectric layer IL5, covering the second connection electrode CNE2. The sixth dielectric layer IL6 may be an organic layer. The light emitting element layer DP_ED may be located on the circuit layer DP_CL. The light emitting element layer DP_ED may include the light emitting element EDM. For example, the light emitting element layer DP_ED may include an organic light emitting material, a quantum dot, a quantum rod, a micro-LED (light-emitting diodes), or a nano-LED. The light emitting element EDM may include a first electrode AE, an emission layer EL, and a second electrode CE.

The first electrode AE may be located on the sixth dielectric layer IL6. The first electrode AE may be connected to the second connection electrode CNE2 through a contact hole CNT3 that penetrates the sixth dielectric layer IL6.

A pixel definition layer IL7 may be located on the sixth dielectric layer IL6, covering a portion of the first electrode AE. An opening OP is defined in the pixel definition layer IL7. The opening OP of the pixel definition layer IL7 exposed at least a portion of the first electrode AE. According to some embodiments, an emission region PXA is defined to correspond to a partial section of the first electrode AE, which partial section is exposed to the opening OP. A non-emission region NPXA may surround the emission region PXA.

The emission layer EL may be located on the first electrode AE. The emission layer EL may be located in the opening OP. For example, the emission layer EL may be formed on each of the pixels. When a plurality of emission layers EL are formed on corresponding pixels, the plurality of emission layers EL may each emit light of one or more of blue, red, and green colors. The present invention, however, is not limited thereto, and the emission layer EL may be provided which is commonly connected to the pixels. In this case, the emission layer EL may provide a blue light or a white light.

The second electrode CE may be located on the emission layer EL. The second electrode CE may be located in common on a plurality of pixels, while having a single unitary shape. The second electrode CE may be supplied with a common voltage and may be called a common electrode.

According to some embodiments, a hole control layer may be located between the first electrode AE and the emission layer EL. The hole control layer may be located in common at the emission region PXA and the non-emission region NPXA. The hole control layer may include a hole transport layer and may further include a hole injection layer. An electronic control layer may be located between the emission layer EL and the second electrode CE. The electronic control layer may include an electronic transport layer and may further include an electronic injection layer. An open mask may be used to form the hole control layer and the electronic control layer that are commonly utilized by or located in a plurality of pixels. The encapsulation layer TFE may be located on the light emitting element layer DP_ED. The encapsulation layer TFE may include an inorganic layer, an organic layer, and an inorganic layer that are sequentially stacked, but the constituent layers of the encapsulation layer TFE are not limited thereto.

The inorganic layers may protect the light emitting element layer DP_ED against moisture and oxygen, and the organic layer may protect the light emitting element layer DP_ED against foreign substances such as dust particles. The inorganic layers may include a silicon nitride layer, a silicon oxynitride layer, a silicon oxide layer, a titanium oxide layer, or an aluminum oxide layer. The organic layer may include an acryl-based organic layer, but embodiments according to the present invention are not limited thereto.

A successive process may form the input sensor ISP on the display panel DP. The input sensor ISP may include a base layer IIL1, a first conductive layer ICL1, a sensing dielectric layer IIL2, a second conductive layer ICL2, and a cover dielectric layer IIL3.

The base layer IIL1 may be an inorganic layer including one of silicon nitride, silicon oxynitride, and silicon oxide. Alternatively, the base layer IIL1 may be an organic layer including an epoxy resin, an acryl resin, or an imide-based resin. The base layer IIL1 may have a single-layered structure or a multi-layered structure in which dielectric layers are stacked along the third direction DR3.

Each of the first and second conductive layers ICL1 and ICL2 may have a single-layered structure or a multi-layered structure in which conductive layers are stacked along the third direction DR3. The single-layered conductive layer may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), or indium zinc tin oxide (IZTO). Additionally or alternatively, the transparent conductive layer may include a metal nano-wire, a graphene, or a conductive polymer such as PEDOT.

The multi-layered conductive layer may include metal layers. The metal layers may include, for example, tri-layered structure of titanium/aluminum/titanium. The multi-layered conductive layer may include at least one metal layer and at least one transparent conductive layer.

One or both of the sensing dielectric layer IIL2 and the cover dielectric layer IIL3 may include an inorganic layer. The inorganic layer may include one or more of aluminum oxide, titanium oxide, silicon oxide, silicon oxynitride, zirconium oxide, and hafnium oxide.

One or both of the sensing dielectric layer IIL2 and the cover dielectric layer IIL3 may include an organic layer. The organic layer may include one or more of an acryl-based resin, methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 5A:
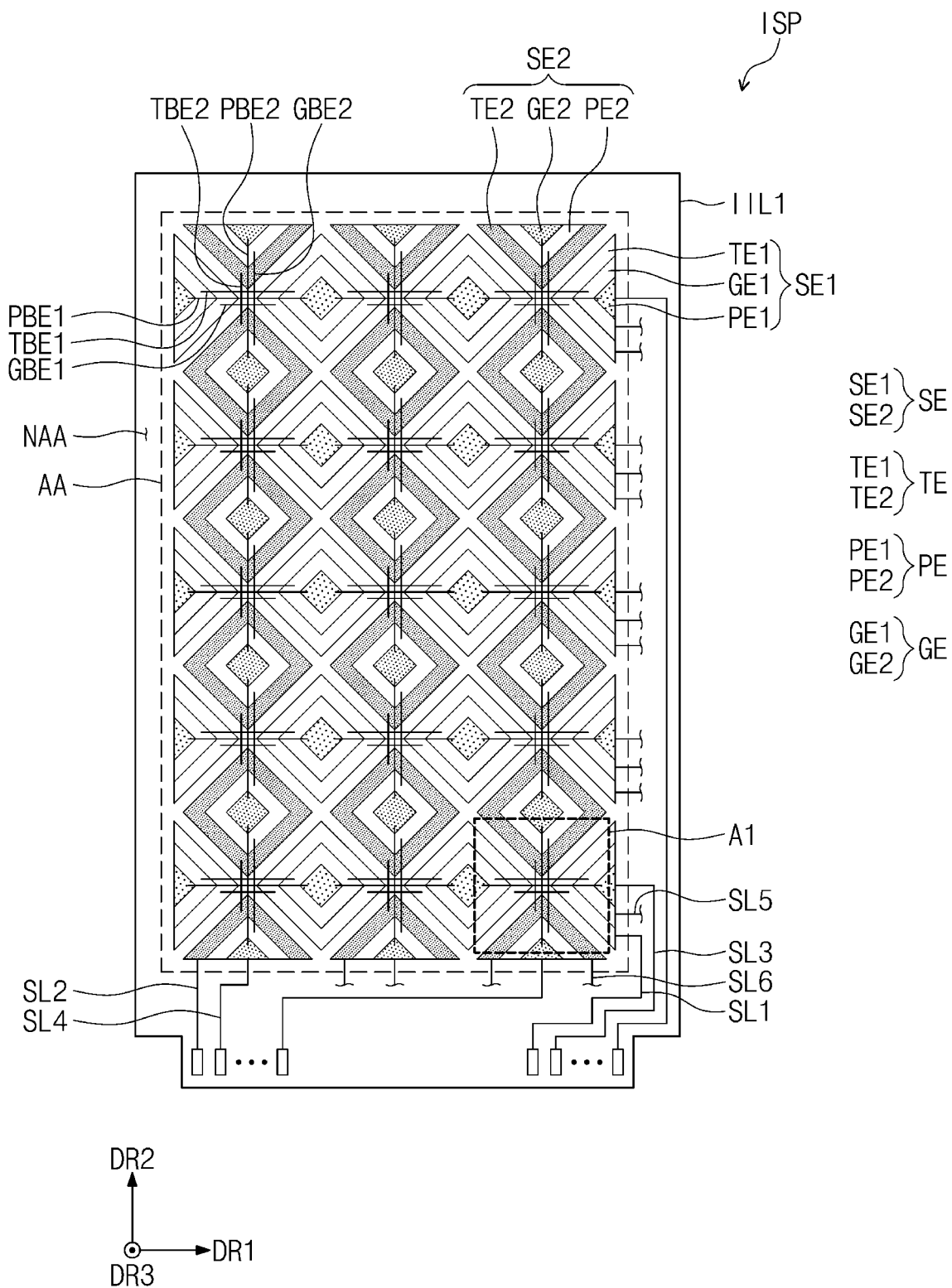
FIG. 5A illustrates a plan view showing an input sensor according to some embodiments of the present invention.
Figure 5B:
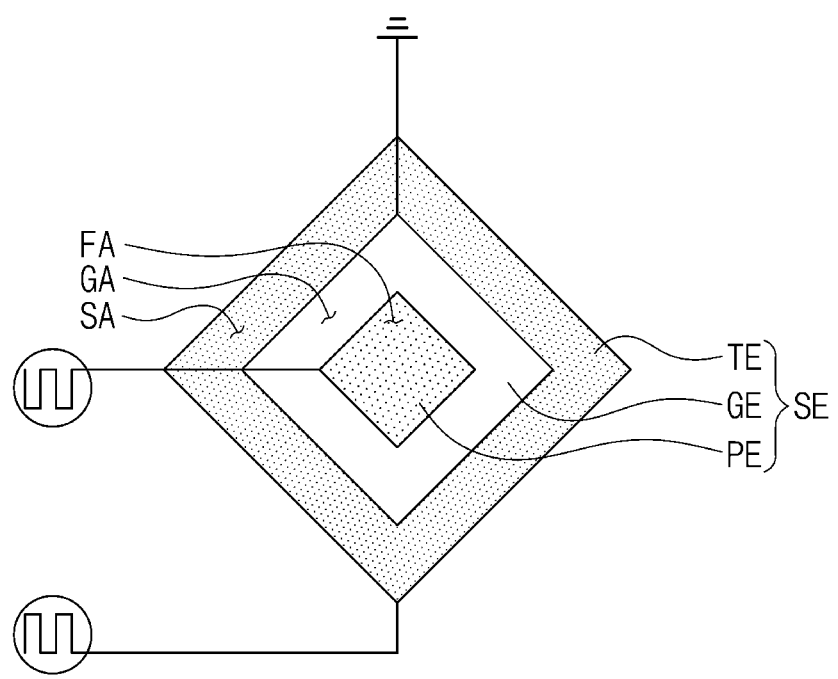
FIG. 5B illustrates a plan view showing a sensing electrode according to some embodiments of the present invention.

FIG. 5A illustrates a plan view showing an input sensor according to some embodiments of the present invention. FIG. 5B illustrates a plan view showing a sensing electrode according to some embodiments of the present invention.

Referring to FIGS. 5A and 5B, the input sensor ISP may include a plurality of sensing electrodes SE. The plurality of sensing electrodes SE may be located on the active region AA. The input sensor ISP may include a plurality of signal lines SL1 to SL6. The plurality of signal lines SL1 to SL6 may be located at the peripheral region NAA.

The plurality of sensing electrodes SE may include a first sensing electrode SE1 and a second sensing electrode SE2. The first sensing electrode SE1 may be provided in plural, and the plurality of first sensing electrodes SE1 may be arranged in the first direction DR1. The second sensing electrode SE2 may be provided in plural, and the plurality of second sensing electrodes SE2 may be arranged in the second direction DR2 that intersects the first direction DR1. The first sensing electrodes SE1 and the second sensing electrodes SE2 may be electrically insulated from each other.

Each of the plurality of sensing electrodes SE may include a first electrode PE and a second electrode TE. The first electrode PE may be a pen electrode that detects the input tool (see AP of FIG. 3), and the second electrode TE may be a touch electrode that detects the user's touch (see US of FIG. 3).

The pen electrode PE may be located on a first region FA defined on each of the sensing electrodes SE, and the touch electrode TE may be located on a second region SA defined on each of the sensing electrodes SE. The second region SA may surround the first region FA. The first region FA may be a closed section that is surrounded by the second region SA.

A third region GA may be defined between the first region FA and the second region SA. The first, second, and third regions FA, SA, and GA may have areas that are not limited to that shown in figures, but may be variously changed. The third region GA may separate the first and second regions FA and SA from each other. A third electrode GE may be located on the third region GA. The third electrode GE may be a ground electrode. The ground electrode GE may be electrically grounded. The ground electrode GE may be located between the pen electrode PE and the touch electrode TE, and may reduce interference between a signal of the pen electrode PE and a signal of the touch electrode TE.

Referring to FIG. 5A, each of the plurality of first sensing electrodes SE1 may include a first pen electrode PE1, a first ground electrode GE1, and a first touch electrode TE1, and each of the plurality of second sensing electrodes SE2 may include a second pen electrode PE2, a second ground electrode GE2, and a second touch electrode TE2.

The input sensor ISP may include a plurality of bridge electrodes that connect the plurality of sensing electrodes SE to each other. The bridge electrode may include a pen bridge electrode PBE1 and PBE2 that connects neighboring ones of the plurality of pen electrodes PE, a touch bridge electrode TBE1 and TBE2 that connects neighboring ones of the plurality of touch electrodes TE, and a ground bridge electrode GBE1 and GBE2 that connects neighboring ones of the plurality of ground electrodes GE.

According to some embodiments, the pen bridge electrode PBE1 and PBE2 may include a first pen bridge electrode PBE1 that connects neighboring one of the plurality of first pen electrodes PE1, and a second pen bridge electrode PBE2 that connects neighboring ones of the plurality of second pen electrodes PE2.

The touch bridge electrode TBE1 and TBE2 may include a first touch bridge electrode TBE1 that connects neighboring ones of the plurality of first touch electrodes TE1, and a second touch bridge electrode TBE2 that connects neighboring ones of the plurality of second touch electrodes TE2.

The ground bridge electrode GBE1 and GBE2 may include a first ground bridge electrode GBE1 that connects neighboring ones of the plurality of first ground electrodes GE1, and a second ground bridge electrode GBE2 that connects neighboring ones of the plurality of second ground electrodes GE2.

The first pen bridge electrode PBE1, the first touch bridge electrode TBE1, and the first ground bridge electrode GBE1 may be located on a different layer from that of the second pen bridge electrode PBE2, the second touch bridge electrode TBE2, and the second ground bridge electrode GBE2.

The input sensor ISP may include a plurality of signal lines SL1 to SL6. The plurality of signal lines SL1 to SL6 may electrically connect the plurality of sensing electrodes SE to the sensor controller (see 100 of FIG. 3). Ones SL5 and SL6 of the plurality of signal lines SL1 to SL6 may be electrically grounded.

A first signal line SL1 is connected to the first touch electrode TE1. A second signal line SL2 is connected to the second touch electrode TE2. A third signal line SL3 is connected to the first pen electrode PE1. A fourth signal line SL4 is connected to the second pen electrode PE2. A fifth signal line SL5 is connected to the first ground electrode GE1. A sixth signal line SL6 is connected to the second ground electrode GE2.

Referring to FIG. 5B, the sensor controller (see 100 of FIG. 3) may provide the touch electrode TE and the pen electrode PE with corresponding signals whose phases are different from each other. For example, the pen electrode PE may be provided with a normal-phase signal as a detection signal, and the touch electrode TE may be provided with a reverse-phase signal as a compensation signal. The reverse-phase signal of the touch electrode TE compensates the normal-phase signal of the pen electrode PE. The reverse-phase signal of the touch electrode TE may cause the display panel DP and the input sensor ISP to have reduced noise therebetween which is produced while the input tool (see AP of FIG. 3) is provided with a normal-phase uplink signal from the pen electrode PE.

According to some embodiments, the pen electrode PE may correspond to a first electrode to which a reverse-phase signal is applied, and the touch electrode TE may correspond to a second electrode to which a normal-phase signal as the detection signal is applied. The touch electrode TE may be a driving electrode that detects an external input from a user's touch and/or an input tool, and the pen electrode PE may be a compensation electrode that compensates noise that is produced during an operation of the touch electrode TE.

For example, the sensor controller (see 100 of FIG. 3) may be configured such that the touch electrode TE is provided with a normal-phase signal to recognize the input tool AP and to detect an external input from a user's touch and/or the input tool AP, and that the pen electrode PE is provided with a reverse-phase signal to cause the input sensor ISP and the display panel DP to have reduced noise therebetween which is produced while the touch electrode TE recognizes the input tool AP and detects the external input.

The ground electrode GE may be separated from the touch electrode TE and the pen electrode PE, and may be supplied with a ground signal. This will be further discussed in detail below with reference to FIGS. 6A and 6B.

Figure 6A:
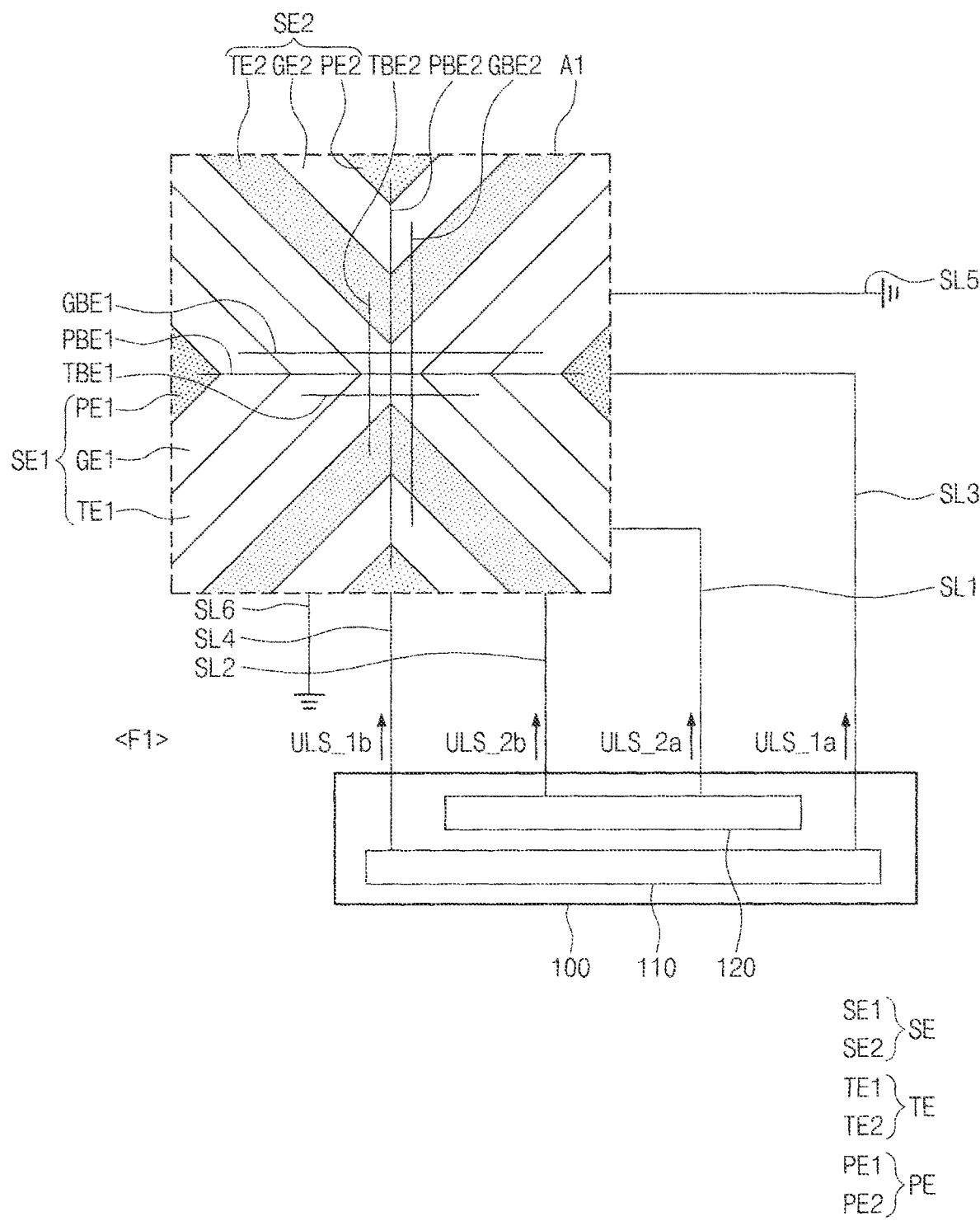
FIG. 6A illustrates a schematic diagram showing an operation of an electronic device in a first frame according to some embodiments of the present invention.
Figure 6B:
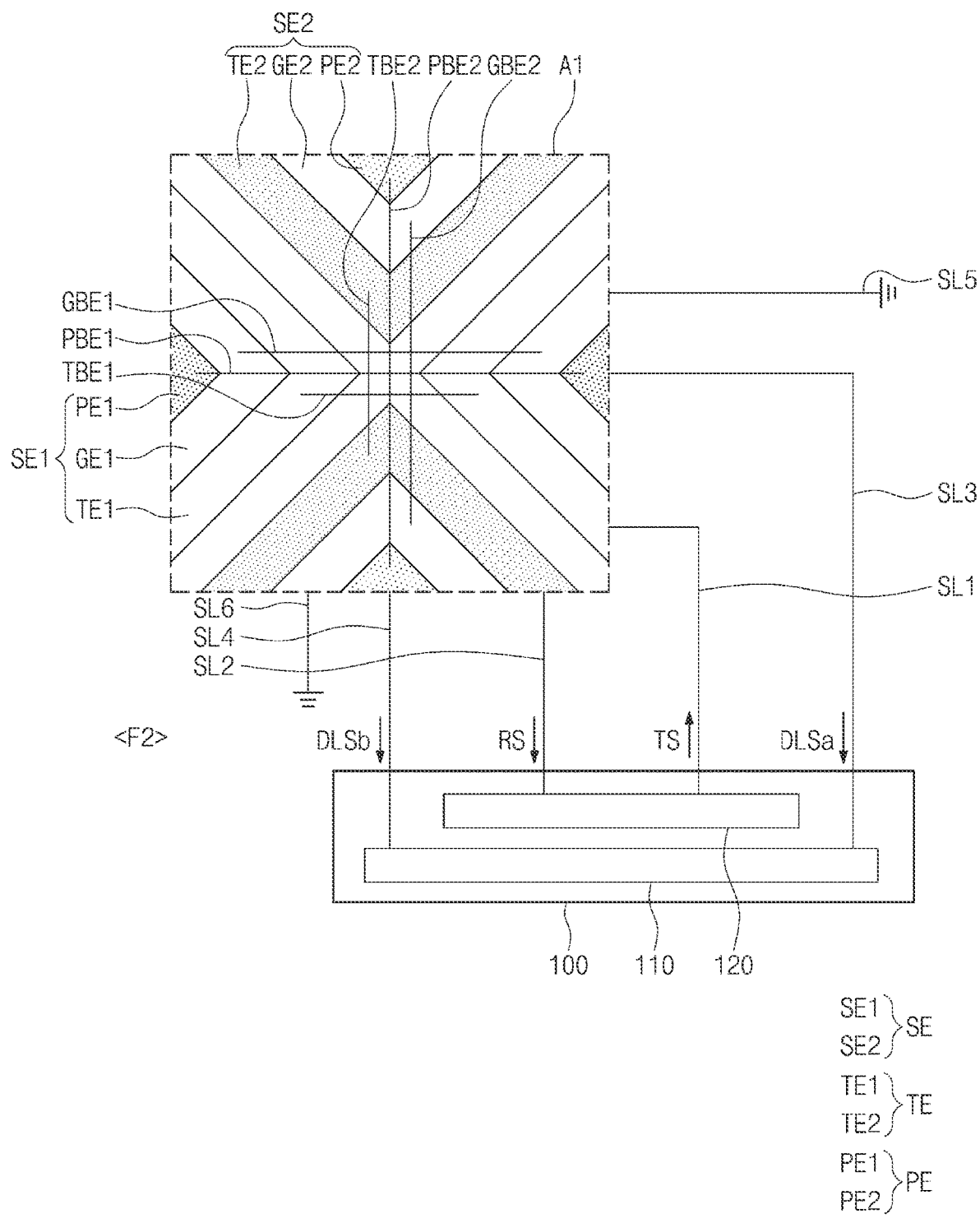
FIG. 6B illustrates a schematic diagram showing an operation of an electronic device in a second frame according to some embodiments of the present invention.

FIG. 6A illustrates a schematic diagram showing an operation of an electronic device in a first frame according to some embodiments of the present invention. FIG. 6B illustrates a schematic diagram showing an operation of an electronic device in a second frame according to some embodiments of the present invention.

Figure 7:
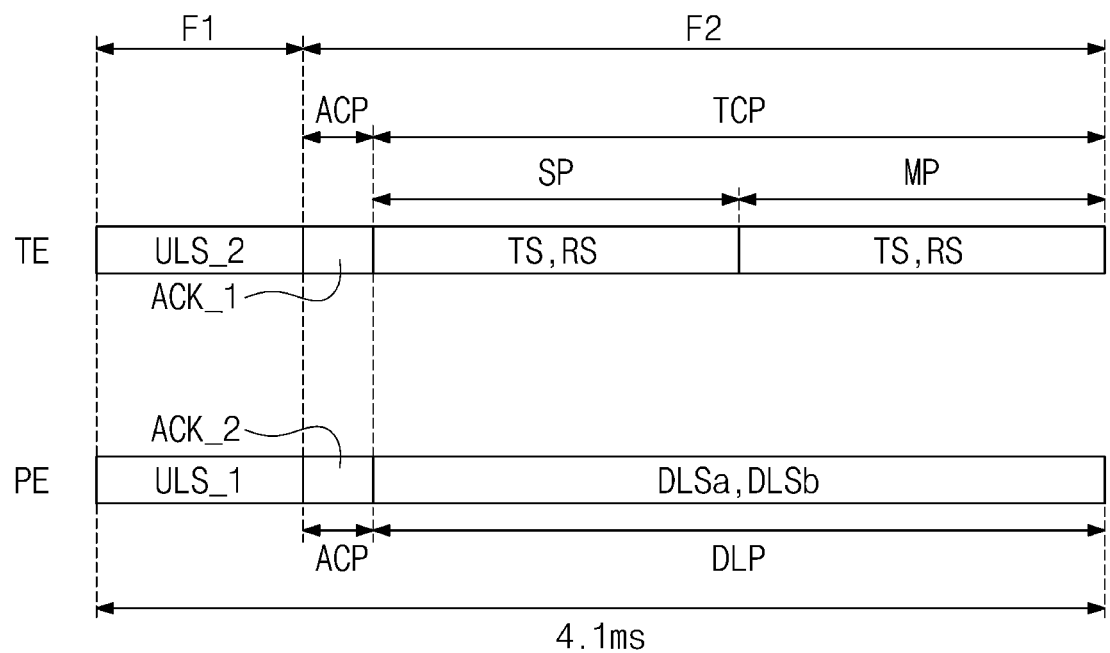
FIG. 7 illustrates a conceptual diagram showing an operation of an electronic device over time according to some embodiments of the present invention.

The electronic device ED may recognize the input tool (see AP of FIG. 3) during a first frame (see F1 of FIG. 7), and may detect an input from the input tool AP and/or the user's touch (see US of FIG. 3) during a second frame (see F2 of FIG. 7).

For example, the sensor controller 100 may be connected to the plurality of sensing electrodes SE of the input sensor ISP, and may thus detect an input that is applied from the user's touch (see US of FIG. 3) and/or the input tool (see AP of FIG. 3).

As shown in FIGS. 6A and 6B, during the first frame F1, the sensor controller 100 may provide the plurality of sensing electrodes SE with an uplink signal ULS_1a, ULS_1b, ULS_2a, and ULS_2b. The plurality of sensing electrodes SE may use the uplink signal ULS_1a, ULS_1b, ULS_2a, and ULS_2b to recognize the input tool AP that approaches. When the input tool AP that approaches is recognized, the input sensor ISP and the input tool AP may be synchronized or paired with each other. As shown in FIG. 6B, when the input sensor ISP and the input tool AP are paired with each other, during the second frame F2, the input tool AP may provide the sensor controller 100 with a downlink signal DLSa and DLSb through the plurality of sensing electrodes SE. Based on the downlink signal DLSa and DLSb, the sensor controller 100 detect an input from the input tool AP.

The uplink signal ULS_1a, ULS_1b, ULS_2a, and ULS_2b may include a first signal ULS_1a and ULS_1b and a second signal ULS_2a and ULS_2b. The first signal ULS_1a and ULS_1b may be applied to the pen electrode PE, and the second signal ULS_2a and ULS_2b may be applied to the touch electrode TE.

According to some embodiments, the sensor controller 100 may provide the first pen electrode PE1 and the second pen electrode PE2 with the first signal ULS_1a and the ULS_1b, respectively. The sensor controller 100 may provide the first touch electrode TE1 and the second touch electrode TE2 with the second signal ULS_2a and ULS_2b, respectively. The first signal ULS_1a and ULS_1b may be an uplink signal provided to the input tool AP that approaches. The second signal ULS_2a and ULS_2b may be a compensation signal to improve noise produced between the input sensor ISP and the display panel (see DP of FIG. 3) during communication between the input tool AP and the first signal ULS_1a and ULS_1b. The second signal ULS_2a and ULS_2b may be a reverse-phase signal of the first signal ULS_1a and ULS_1b. For example, the first signal ULS_1a and ULS_1b and the second signal ULS_2a and ULS_2b may have their phases opposite to each other.

As shown in FIG. 6B, the sensor controller 100 may detect an external input through the plurality of sensing electrodes SE. The sensor controller 100 may detect a variation in mutual capacitance formed between the first touch electrode TE1 and the second touch electrode TE2, thereby detecting an external input.

During the second frame F2, the sensor controller 100 may provide the first touch electrode TE1 with a driving signal TS. The sensor controller 100 may receive a detection signal RS from the second touch electrode TE2. Therefore, the sensor controller 100 may compare the driving signal TS and its corresponding detection signal RS with each other, and then based on a variation therebetween, may generate a coordinate value of a position where the first input (see TC1 of FIG. 3) is provided.

During the second frame F2, the sensor controller 100 may receive the downlink signal DLSa and DLSb through the first and second pen electrodes PE1 and PE2 from the input tool AP. The downlink signal DLSa and DLSb may include pen data, position information of the input tool AP, tilts of the input tool AP, and state information. Based on a first downlink signal DLSa and a second downlink signal DLSb, the sensor controller 100 may determine a coordinate of the input tool AP.

The sensor controller 100 may be connected to and may independently drive the pen electrode PE and the touch electrode TE.

Referring to FIGS. 6A and 6B, according to some embodiments, the sensor controller 100 may include an input-tool controller 110 and a touch controller 120. The input-tool controller 110 and the touch controller 120 may independently control the pen electrode PE and the touch electrode TE to drive individually from each other. The input-tool controller 110 may be connected to the pen electrode PE, and the touch controller 120 may be connected to the touch electrode TE.

The input-tool controller 110 and the touch controller 120 may independently operate at different frequency bands from each other, and therefore during the second frame F2, the sensor controller 100 may simultaneously drive the pen electrode PE and the touch electrode TE to respectively detect an input from the input tool AP and an input from the user's touch. As a result, the electronic device ED may operate at high speeds with a frequency equal to or greater than about 240 Hz.

FIG. 7 illustrates a conceptual diagram showing an operation of an electronic device over time according to some embodiments of the present invention.

According to some embodiments, the sensor controller 100 may use the plurality of sensing electrodes SE to drive the input sensor ISP in the first frame F1 and the second frame F2.

During the first frame F1, the sensor controller 100 may provide the pen electrode PE and the touch electrode TE with an uplink signal ULS_1 and ULS_2. As discussed above, the pen electrode PE may be provided with a normal-phase first signal ULS_1 of the uplink signal ULS_1 and ULS_2, and the touch electrode TE may be provided with a reverse-phase second signal ULS_2 of the uplink signal ULS_1 and ULS_2, which may result in a reduction in noise produced between the input sensor ISP and the display panel DP.

During the second frame F2, the sensor controller 100 may independently drive the pen electrode PE and the touch electrode TE at divided frequency bands different from each other. The sensor controller 100 may receive the downlink signal DLSa and DLSb through the pen electrode PE from the input tool (see AP of FIG. 3). During the second frame F2, the sensor controller 100 may transfer and receive the driving signal TS and the detection signal RS through the touch electrode TE when the user's touch US occurs. During the second frame F2, the pen electrode PE may detect the input tool AP for a downlink period DLP, and the touch electrode TE may detect the user's touch US for a touch detection period TCP.

The second frame F2 may include a response period ACP. In a case where, during the response period ACP, the sensor controller 100 receives a response signal ACK_2 and ACK_1 for the uplink signal ULS_1 and ULS_2, the sensor controller 100 may allow a downlink period DLP to begin when approach of the input tool AP is ascertained. For example, when the sensor controller 100 receives a second response signal ACK_2 for the input tool AP at the response period ACP, the downlink period DLP may begin. When downlink period DLP begins, the sensor controller 100 may receive the downlink signal DLSa and DLSb through the pen electrode PE, and based on the received downlink signals DLSa and DLSb, a coordinate of the input tool AP may be determined. The user's touch US may cause that the touch electrode TE, which is physically separated, independently detects the first input TC1 during the second frame F2.

The input sensor (see ISP of FIG. 3) may detect the first input (see TC1 of FIG. 3) in a first mode SP and a second mode MP. In this description, the first mode SP may be defined to refer to a self-capacitance operation mode in which a plurality of touch electrodes TE1 and TE2 of the input sensor ISP are integrally formed into a single sensing electrode to detect the first input TC1. The second mode MP may be defined to refer to a mutual-capacitance operation mode in which the first touch electrodes TE1 and the second touch electrodes TE2 of the input sensor ISP are capacitively coupled to detect the first input TC1. For example, the second frame F2 may include a first operation period in which the input sensor ISP operates in the first mode SP, and may also include a second operation period in which the input sensor ISP operates in the second mode MP. The input sensor ISP may detect the first input TC1 in the first mode SP during the first operation period and in the second mode MP during the second operation period. As an example of the present invention, in the second frame F2, the second operation period may come after the first operation period. In addition, the second operation period may have a time length greater than that of the first operation period.

The input sensor ISP according to some embodiments of the present invention may not need to time-divisionally detect the input tool (see AP of FIG. 3) and the user's touch (US of FIG. 3) during the second frame F2, but rather may detect the input tool AP and the user's touch US at the same time during the second frame F2, with the result that the input sensor ISP may operate at high speeds. For example, in the case of time division, the sensor controller 100 may control the second input TC2 from the input tool AP and the first input TC1 from the user's touch US to each drive at a frequency of about 120 Hz, but according to some embodiments of the present invention, because the pen electrode PE and the touch electrode TE are separated from each other, the two inputs may all be possible to drive at a frequency of about 240 Hz without driving time loss caused by time division. In this case, an operation of the first frame F1 and the second frame F2 may be possible within about 4.1 ms.

Figure 8A:
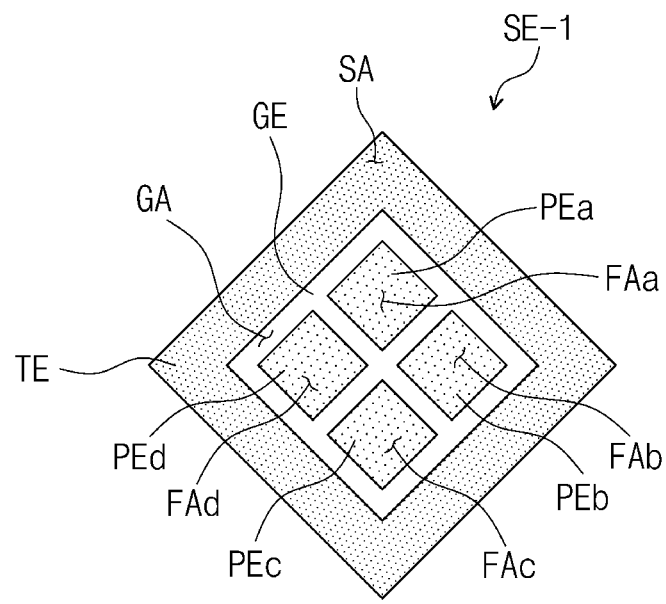
FIGS. 8A and 8B illustrate plan views showing a sensing electrode according to some embodiments of the present invention.
Figure 8B:
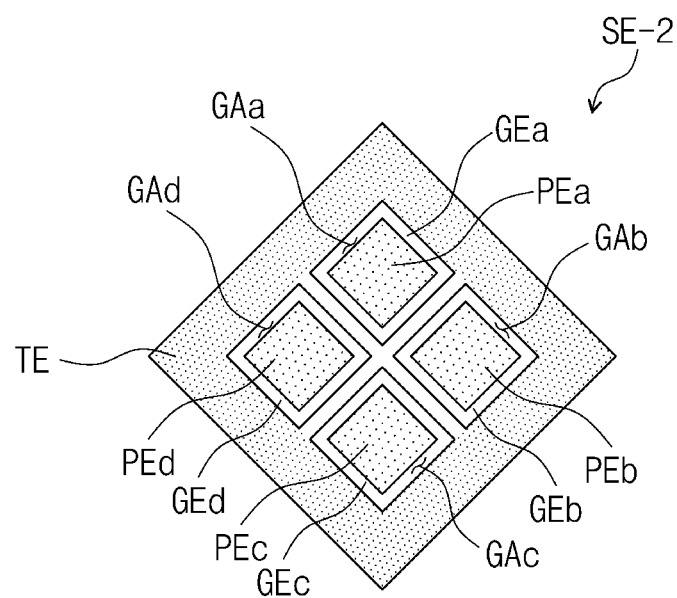

FIGS. 8A and 8B illustrate plan views showing a sensing electrode according to some embodiments of the present invention.

Referring to FIG. 8A, a sensing electrode SE-1 may include a plurality of pen electrodes PEa, PEb, PEc, and PEd. The plurality of pen electrodes PEa, PEb, PEc, and PEd may be correspondingly located on a plurality of first regions FAa, FAb, FAc, and FAd surrounded by the second region (see SA of FIG. 5B). The plurality of pen electrodes PEa, PEb, PEc, and PEd may precisely detect an input from the input tool (see AP of FIG. 3). Each of the plurality of pen electrodes PEa, PEb, PEc, and PEd may be connected through a corresponding signal line to the sensor controller (see 100 of FIG. 3). The number of the plurality of pen electrodes PEa, PEb, PEc, and PEd is not limited to that shown in figures.

A third region GA may be defined between the second region SA and the plurality of first regions FAa, FAb, FAc, and FAd. As shown in FIG. 8A, the third region GA may surround the plurality of first regions FAa, FAb, FAc, and FAd. The third region GA may include a ground electrode GE that is electrically grounded. As shown in FIG. 8B, a sensing electrode SE-2 may include a plurality of third regions GAa, GAb, GAc, and GAd. The plurality of third regions GAa, GAb, GAc, and GAd may correspondingly surround a plurality of first regions FAa, FAb, FAc, and FAd. A plurality of ground electrodes GEa, GEb, GEc, and GEd may be correspondingly located on the plurality of third regions GAa, GAb, GAc, and GAd.

An electronic device according to some embodiments of the present invention may be configured such that a sensing electrode is separated into a touch electrode which detects a touch and a pen electrode which detects an input tool such as a pen, and that the touch electrode and then pen electrode are driven independently of each other, and accordingly an input sensor may operate at high speeds without loss of driving time. In addition, the driving time may have such a good margin that it is unnecessary to use a high driving voltage, which may result in an improvement of power consumption.

Some embodiments have been described in the specification and drawings. Although specific terms are used herein, they are merely used for the purpose of describing the present invention rather than limiting technical meanings or scopes of the present invention disclosed in the claims. Therefore, it will be appreciated by a person of ordinary skill in the art that various modifications and equivalent embodiments can be made from the present invention. In conclusion, the authentic technical scope of the present invention to be protected shall be determined by the technical concepts of the accompanying claims, and their equivalents.

What is claimed is:

1. An electronic device, comprising:
a display panel; and
an input sensor on the display panel,
wherein the input sensor includes a plurality of sensing electrodes, each having a first region and a second region that surrounds the first region, each of the plurality of sensing electrodes including a pen electrode configured to detect an input tool and a touch electrode configured to detect a touch input,
wherein the pen electrode is at the first region, and
wherein the touch electrode is at the second region;
wherein each of the plurality of sensing electrodes further includes a ground electrode at a third region between the first region and the second region.

2. The electronic device of claim 1, wherein the pen electrode and the touch electrode are separated from each other across the ground electrode,
wherein the pen electrode, the touch electrode, and the ground electrode are electrically insulated from each other.

3. The electronic device of claim 1, further comprising a sensor controller connected to the input sensor,
wherein, during a first frame, the sensor controller is configured to provide the pen electrode and the touch electrode with an uplink signal transmitted to the input sensor, and
wherein, during a second frame, the sensor controller is configured to receive a downlink signal through the pen electrode from the input tool and receives a touch signal through the touch electrode from a user's touch.

4. The electronic device of claim 3, wherein the uplink signal includes a first signal applied to the pen electrode and a second signal applied to the touch electrode,
wherein the first signal and the second signal have phases opposite to each other.

5. The electronic device of claim 4, wherein the sensor controller includes an input-tool controller and a touch controller, wherein the input-tool controller is configured to apply the first signal to the pen electrode during the first frame and to receive the downlink signal from the input tool during the second frame, and wherein the touch controller is configured to apply the second signal to the touch electrode during the first frame and to receive the touch signal from the user's touch during the second frame.

6. The electronic device of claim 3, wherein the plurality of sensing electrodes include:

a plurality of first sensing electrodes arranged in a first direction; and a plurality of second sensing electrodes arranged in a second direction that intersects the first direction, wherein the first sensing electrodes and the second sensing electrodes are electrically insulated from each other.

7. The electronic device of claim 6, wherein the pen electrode includes a first pen electrode and a second pen electrode, wherein each of the first sensing electrodes includes the first pen electrode, and wherein each of the second sensing electrodes includes the second pen electrode.

8. The electronic device of claim 6, wherein the touch electrode includes a first touch electrode and a second touch electrode, wherein each of the first sensing electrodes includes the first touch electrode, and wherein each of the second sensing electrodes includes the second touch electrode.

9. The electronic device of claim 7, wherein the downlink signal includes:

a first downlink signal received from the first pen electrode; and a second downlink signal received from the second pen electrode, wherein, based on the first and second downlink signals, a sensor controller is configured to determine a coordinate of the input tool.

10. The electronic device of claim 1, wherein the input sensor further includes:

a pen bridge electrode that connects a plurality of pen electrodes that are adjacent to each other;

a touch bridge electrode that connects a plurality of touch electrodes that are adjacent to each other; and a ground bridge electrode that connects a plurality of ground electrodes that are adjacent to each other.

11. The electronic device of claim 1, wherein the input sensor further includes:

a first signal line connected to the pen electrode;

a second signal line connected to the touch electrode; and a third signal line connected to the ground electrode, wherein each of the first and second signal lines is connected to a sensor controller configured to drive the input sensor, and wherein the third signal line is grounded.

12. The electronic device of claim 1, wherein the first region surrounded by the second region is provided in plural, wherein the pen electrode is at each of the plurality of first regions.

13. The electronic device of claim 12, wherein each of the plurality of sensing electrodes further includes a ground electrode that is electrically grounded, wherein the ground electrode is at each of a plurality of third regions that are defined between the second region and the plurality of first regions, the plurality of third regions correspondingly surrounding the plurality of first regions.

14. An electronic device, comprising:

a display panel;

an input sensor on the display panel; and a sensor controller connected to the input sensor and configured to drive the input sensor, wherein the input sensor includes a plurality of sensing electrodes each having a first region and a second region that surrounds the first region, each of the plurality of sensing electrodes including a pen electrode at the first region and a touch electrode at the second region, wherein the sensor controller is configured to detect an input tool through the pen electrode and to detect a touch input through the touch electrode, wherein the sensor controller is configured to independently drive the pen electrode and the touch electrode at different frequency bands from each other.

15. The electronic device of claim 14, wherein during a first frame, the sensor controller is configured to provide the input tool with an uplink signal through the pen electrode and the touch electrode, and during a second frame, the sensor controller is configured to receive a downlink signal through the pen electrode from the input tool and to receive a touch signal through the touch electrode from a user's touch.

16. The electronic device of claim 15, wherein the uplink signal includes a first signal applied to the pen electrode and a second signal applied to the touch electrode, wherein the first signal and the second signal have phases opposite to each other.

17. The electronic device of claim 14, wherein each of the plurality of sensing electrodes further includes a ground electrode that is electrically grounded, wherein the ground electrode is at a third region between the first region and the second region.

18. An electronic device, comprising:

a display panel;

an input sensor on the display panel; and a sensor controller connected to the input sensor, wherein the input sensor includes a plurality of sensing electrodes each having a first region and a second region that surrounds the first region, each of the plurality of sensing electrodes including a first electrode at the first region and a second electrode at the second region, wherein the sensor controller is configured to provide the second electrode with a detection signal to detect an input from one or both of an input tool and a user's touch and to provide the first electrode with a compensation signal to compensate the detection signal, wherein the detection signal and the compensation signal have phases opposite to each other.

19. The electronic device of claim 18, wherein each of the plurality of sensing electrodes further includes a third electrode that is electrically grounded, wherein the third electrode is at a third region between the first region and the second region.

* * * * *